(12) United States Patent
Inoue

(10) Patent No.: US 12,054,107 B2
(45) Date of Patent: Aug. 6, 2024

(54) CONNECTOR HOLDER AND WIRE HARNESS

(71) Applicant: SUMITOMO WIRING SYSTEMS, LTD., Mie (JP)

(72) Inventor: Takuya Inoue, Mie (JP)

(73) Assignee: SUMITOMO WIRING SYSTEMS, LTD., Mie (JP)

(*) Notice: Subject to any disclaimer, the term of this patent is extended or adjusted under 35 U.S.C. 154(b) by 144 days.

(21) Appl. No.: 17/782,331

(22) PCT Filed: Nov. 24, 2020

(86) PCT No.: PCT/JP2020/043531
§ 371 (c)(1),
(2) Date: Jun. 3, 2022

(87) PCT Pub. No.: WO2021/111915
PCT Pub. Date: Jun. 10, 2021

(65) Prior Publication Data
US 2023/0042263 A1     Feb. 9, 2023

(30) Foreign Application Priority Data
Dec. 6, 2019   (JP) .................................. 2019-221159

(51) Int. Cl.
*B60R 16/02*     (2006.01)

(52) U.S. Cl.
CPC ................................ *B60R 16/0215* (2013.01)

(58) Field of Classification Search
CPC .................................................. B60R 16/0215
USPC ....................................................... 174/72 A
See application file for complete search history.

(56) References Cited

U.S. PATENT DOCUMENTS

| 5,460,530 | A | * | 10/1995 | Toba | .................... | B60R 16/0207 174/72 A |
| 5,876,228 | A | * | 3/1999 | Hayashi | ............. | H01R 13/6315 439/701 |
| 6,062,888 | A | * | 5/2000 | Takiguchi | ........... | B60R 16/0215 439/247 |

(Continued)

FOREIGN PATENT DOCUMENTS

| JP | 2001-006804 A | 1/2001 |
| JP | 2003-197307 A | 7/2003 |
| JP | 2017-206197 A | 11/2017 |

OTHER PUBLICATIONS

International Search Report issued on Jan. 19, 2021 for WO 2021/111915 A1 (4 pages).

*Primary Examiner* — Timothy J Thompson
*Assistant Examiner* — Michael F McAllister
(74) *Attorney, Agent, or Firm* — Venjuris, P.C.

(57) ABSTRACT

A connector holder is capable of minimizing or preventing interference between a wire harness of an installment panel and a vehicle body. A connector holder is provided with a locking portion with a projecting shape that allows it to lock into a cover attachment hole formed in an installment panel. A wire harness is provided with a connector holding portion for holding a connector of the wire harness and a bolt cover portion extending from the connector holding portion. The bolt cover portion is configured to cover a bolt fixed to a vehicle body in a state where the connector holding portion is fixed to the vehicle body. The locking portion is provided on the bolt cover portion.

4 Claims, 3 Drawing Sheets

(56) References Cited

U.S. PATENT DOCUMENTS

| | | | | |
|---|---|---|---|---|
| 6,159,019 | A * | 12/2000 | Norizuki | H01R 13/516 |
| | | | | 174/72 A |
| 6,321,446 | B1 * | 11/2001 | Iwata | H01R 13/743 |
| | | | | 439/157 |
| 6,402,536 | B2 * | 6/2002 | Tsukamoto | H02G 3/38 |
| | | | | 439/211 |
| 6,780,020 | B2 * | 8/2004 | Kondo | H01R 25/161 |
| | | | | 439/34 |
| 7,805,888 | B2 * | 10/2010 | Mersch | B60J 5/0468 |
| | | | | 49/502 |
| 2017/0253199 | A1 | 9/2017 | Tsunoda et al. | |
| 2017/0324189 | A1 * | 11/2017 | Baughman | H01R 13/5202 |

* cited by examiner

CONNECTOR HOLDER AND WIRE HARNESS

CROSS REFERENCE TO RELATED APPLICATIONS

This application is a national phase of PCT application No. PCT/JP2020/043531, filed on 24 Nov. 2020, which claims priority from Japanese patent application No. 2019-221159, filed on 6 Dec. 2019, all of which are incorporated herein by reference.

TECHNICAL FIELD

The present disclosure relates to a connector holder and a wire harness.

BACKGROUND

In Patent Document 1, an installment panel of a vehicle and a wire harness routed through an installment panel are described. The installment panel is attached to a vehicle body after the wire harness and various electric devices are installed in the installment panel.

PRIOR ART DOCUMENT

Patent Document

Patent Document 1: JP 2017-154703 A

SUMMARY OF THE INVENTION

Problems to be Solved

A known wire harness provided in an installment panel is fixed to a vehicle body after the installment panel is attached to the vehicle body. Such a wire harness may interfere with the vehicle body and be damaged when the installment panel is attached to the vehicle body due to it extending out from the installment panel.

An aspect of the present disclosure is directed at providing a connector holder capable of minimizing or preventing interference between a wire harness of an installment panel and a vehicle body and a wire harness.

Means to Solve the Problem

A connector holder according to the present disclosure is mounted on a wire harness attached to an installment panel of a vehicle and includes a locking portion with projecting shape that allows the locking portion to be locked in a cover attachment hole formed in the installment panel, the cover attachment hole being for attaching a cover to the installment panel.

Also, a wire harness according to the present disclosure includes an electrical wire extending from an installment panel; a connector provided on an end portion of the electrical wire; and the connector holder described above connected to the connector.

Effect of the Invention

According to the present disclosure, a connector holder can be provided that is capable of minimizing or preventing interference between a wire harness of an installment panel and a vehicle body and a wire harness.

DETAILED DESCRIPTION TO EXECUTE THE INVENTION

Description of Embodiments of the Disclosure

Figure 1:
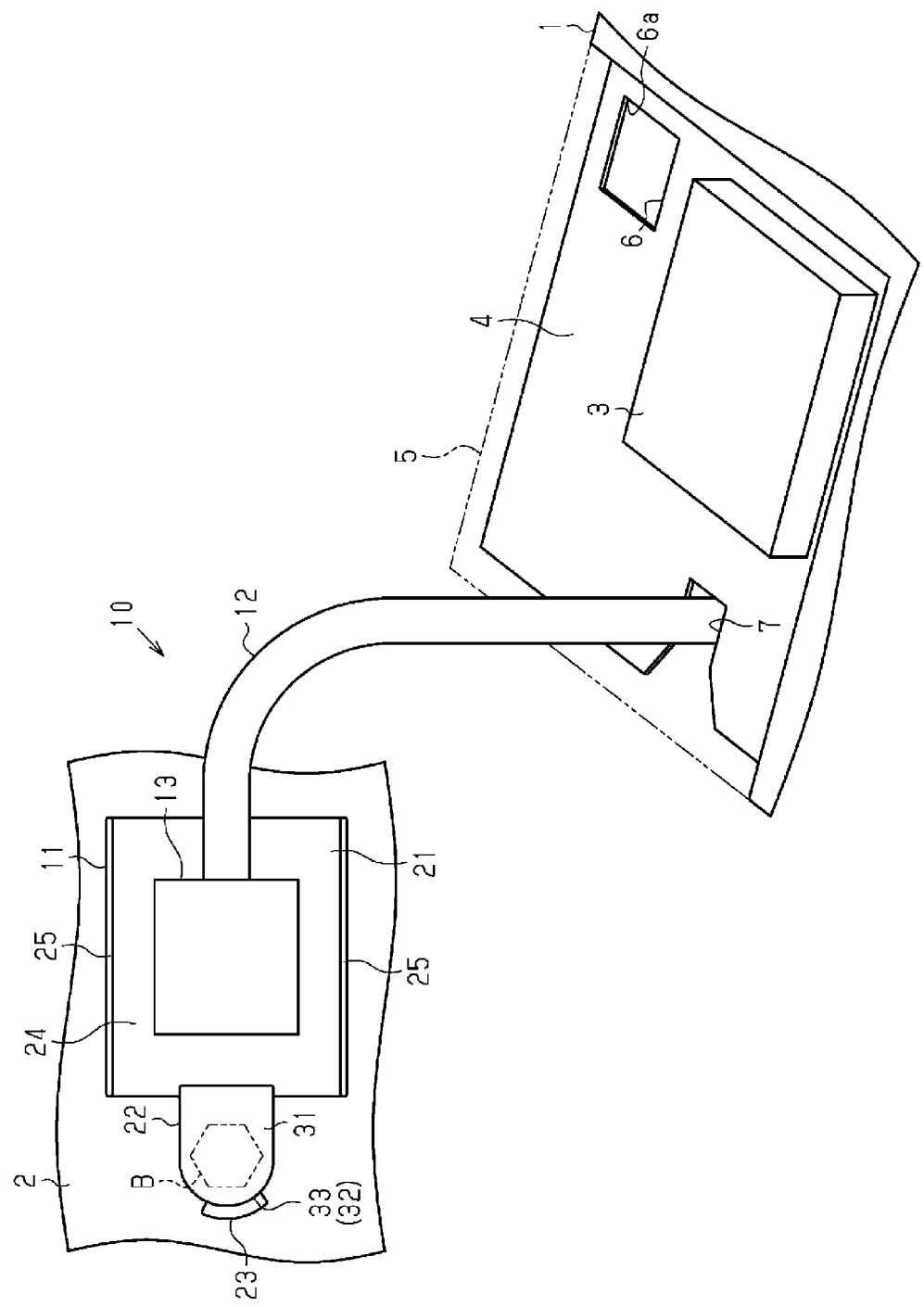
FIG. 1 is a schematic view illustrating a portion of an installment panel including a wire harness of an embodiment and a portion of a vehicle.

Firstly, embodiments of the present disclosure will be listed and described.

1. A connector holder according to the present disclosure is a connector holder mounted on a wire harness attached to an installment panel of a vehicle and including a locking portion with projecting shape that allows the locking portion to be locked in a cover attachment hole formed in the installment panel, the cover attachment hole being for attaching a cover to the installment panel.

According to this configuration, by the locking portion of the connector holder being locked in the cover attachment hole of the installment panel, the wire harness can be temporarily held in the installment panel in the state before the installment panel is attached to the vehicle body. By temporarily holding the wire harness, the wire harness is prevented from freely hanging down from the installment panel. This allows interference between the wire harness and the vehicle body to be minimized or prevented when the installment panel is attached to the vehicle body. Also, with this configuration, because the existing cover attachment hole is used to temporarily hold the connector holder, there is no need to provide a separate holding member or the like for temporarily holding the connector holder, which means an increase in the number of components is not needed in the configuration.

2. The wire harness described above preferably further includes a connector holding portion for holding a connector of the wire harness; and a bolt cover portion that extends from the connector holding portion, wherein the bolt cover portion is configured to cover a bolt fixed to a vehicle body in a state where the connector holding portion is fixed to the vehicle body; and the locking portion is provided on the bolt cover portion. According to this configuration, a suitable configuration can be achieved because the locking portion can be easily locked on the cover attachment hole due to the locking portion being provided on the bolt cover portion extending from the connector holding portion.

3. The bolt cover portion preferably includes a main surface portion facing the bolt in a projection direction of the bolt from a surface of the vehicle body and a side portion projecting toward the vehicle body from an edge portion of the main surface portion; and the locking portion preferably projects from the side portion to a side opposite the main surface portion. According to this configuration, the connector holder is suitably held in the cover attachment hole by the side portion of the bolt cover portion and the locking portion projecting from the side portion.

4. The cover is preferably configured to cover an electric device attached to the installment panel. According to this configuration, the connector holder can be temporarily held in the cover attachment hole for the cover which covers the electric device installed in the installment panel.

5. A wire harness of the present disclosure includes an electrical wire extending from an installment panel; a connector provided on an end portion of the electrical wire; and the connector holder described above connected to the connector.

According to this configuration, by the locking portion of the connector holder being locked in the cover attachment hole of the installment panel, the wire harness can be temporarily held in the installment panel in the state before the installment panel is attached to the vehicle body. By temporarily holding the wire harness, the wire harness is prevented from freely hanging down from the installment panel. This allows interference between the wire harness and the vehicle body to be minimized or prevented when the installment panel is attached to the vehicle body.

Description of Embodiments of the Present Disclosure

A specific example of a connector holder and a wire harness according to the present disclosure will be described below with reference to the drawings. Note that the present invention is not limited to these examples and is defined by the scope of the claims, and all modifications that are equivalent to or within the scope of the claims are included. Also, parallel as used in the present disclosure does not mean strictly parallel and means being parallel within a width whereby the effects can be achieved and that is also within a range considered to be parallel.

As illustrated in FIG. 1, a wire harness 10 of the present embodiment is attached to an installment panel 1 of a vehicle. The wire harness 10 extends from the installment panel 1, and a connector holder 11 of the wire harness 10 is fixed to a vehicle body 2. Note that only a portion, for example, the pillar, of the vehicle body 2 is illustrated in FIG. 1.

The installment panel 1 is provided with a plurality of wire harnesses including the wire harness 10, a plurality of electric devices including an electric device 3, and the like. The installment panel 1 is attached to the vehicle body 2 with the plurality of wire harnesses and the plurality of electric devices attached to the installment panel 1. Note that an example of the electric device 3 includes a speaker.

The electric device 3 is attached to a device mounting portion 4 provided recessed in the upper surface of the installment panel 1. A cover 5 that covers the electric device 3 is attached to the device mounting portion 4. A cover attachment hole 6 for attaching the cover 5 to the installment panel 1, for example, to the device mounting portion 4, is formed in the device mounting portion 4. By a not-illustrated catch portion of the cover 5 locking into the cover attachment hole 6, the cover 5 is detachably attached to the device mounting portion 4. Note that the cover attachment hole 6 of the present embodiment has a rectangular shape in a plan view. In other words, the peripheral edge of the cover attachment hole 6 includes a corner portion 6a formed by two orthogonal sides.

(Wire Harness 10)

The wire harness 10 is provided with an electrical wire 12 extending from the installment panel 1, a connector 13 provided at an end portion of the electrical wire 12, and the connector holder 11 connected to the connector 13.

The electrical wire 12 extends from a lead out portion 7 formed in the installment panel 1 to the upper surface side of the installment panel 1. The connector 13 and the connector holder 11 are provided on the end portion of the electrical wire 12 extending out from the lead out portion 7.

The connector 13 is fixed to the vehicle body 2 via the connector holder 11. Also, the connector 13 is connected to a connector of a not-illustrated other wire harness, for example, in a state where the connector 13 is fixed to the vehicle body 2.

(Connector Holder 11)

The connector holder 11 is an article made by injection molding using a synthetic resin, for example. The connector holder 11 functions as a bracket for protecting a portion of the electrical wire 12 and the connector 13 and for fixing the connector 13 to the vehicle body 2. The connector holder 11 is provided with a connector holding portion 21 for holding the connector 13, a bolt cover portion 22 extending from the connector holding portion 21, and a locking portion 23 with a projecting shape that allows it to lock into the cover attachment hole 6.

The connector holding portion 21 is provided with a main portion 24 connected to the connector 13 and a pair of side walls 25 extending from both edges of the main portion 24 in the width direction. The connector 13 is detachably connected to the main portion 24 of the connector holding portion 21 via a so-called snap-fit structure. The connector 13 is disposed between the opposing pair of side walls 25.

A not-illustrated fixing portion that is fixed to the vehicle body 2 is provided on the back surface side of the main portion 24 of the connector holding portion 21, in other words, the opposite side to the side where the connector 13 is provided. The fixing portion, for example, has a typical clip-like shape that allows it to lock into and be fixed in a not-illustrated installation hole of the vehicle body 2.

(Bolt Cover Portion 22)

The bolt cover portion 22 extends out from the edge portion of the main portion 24 of the connector holding portion 21. The bolt cover portion 22 of the present embodiment extends out from a portion of the edge portion of the main portion 24 where the side walls 25 are not formed. The bolt cover portion 22 is configured to cover a bolt B fixed to the vehicle body 2 in a state where the fixing portion of the connector holding portion 21 is fixed to the vehicle body 2.

Figure 4:
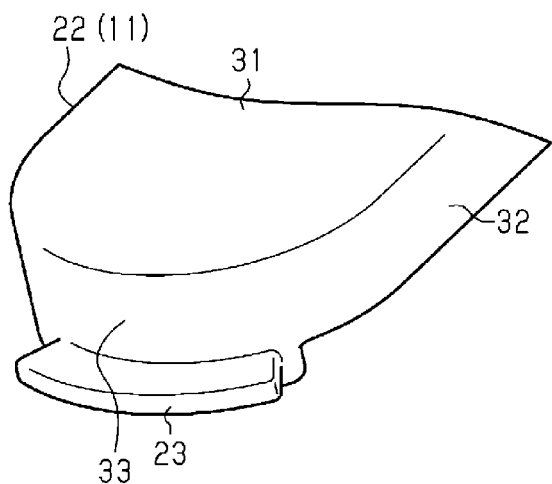
FIG. 4 is a perspective view illustrating a main portion of the connector holder magnified.

Specifically, as illustrated in FIGS. 1 and 4, the bolt cover portion 22 is provided with a main surface portion 31 that faces the bolt B in a projection direction (direction orthogonal to the paper surface in FIG. 1) of the bolt B from the surface of the vehicle body 2 and a side portion 32 projecting from the edge portion of the main surface portion 31 toward the vehicle body 2.

The leading end portion of the main surface portion 31 in the present embodiment has a semicircular shape in a plan view. The side portion 32 is formed from both edges of the main surface portion 31 in the width direction around to at or near the semicircular leading end portion. In other words, the side portion 32 includes a curved surface portion 33 corresponding to the semicircular shape of the leading end portion of the main surface portion 31.

(Locking Portion 23)

The locking portion 23 is formed projecting from the leading end portion of the bolt cover portion 22. In the present embodiment, the locking portion 23 has a shape that projects outward (in other words, to the side opposite the main surface portion 31) from the curved surface portion 33 of the side portion 32. Also, the locking portion 23 is formed on a portion of the curved surface portion 33 that follows the semicircular shape in the circumferential direction. The upper surface of the locking portion 23 has a planar shape that runs parallel with the main surface portion 31 of the bolt cover portion 22. Note that the shape of the locking portion 23, specifically the position, width, and the like in the circumferential direction of the locking portion 23, is preferably set as appropriate according to the positional relationship between the lead out portion 7 and the cover attachment hole 6, the shape of the cover attachment hole 6, the shape of the connector holder 11, and the like.

Next, the operation of the present embodiment will be described.

Figure 2:
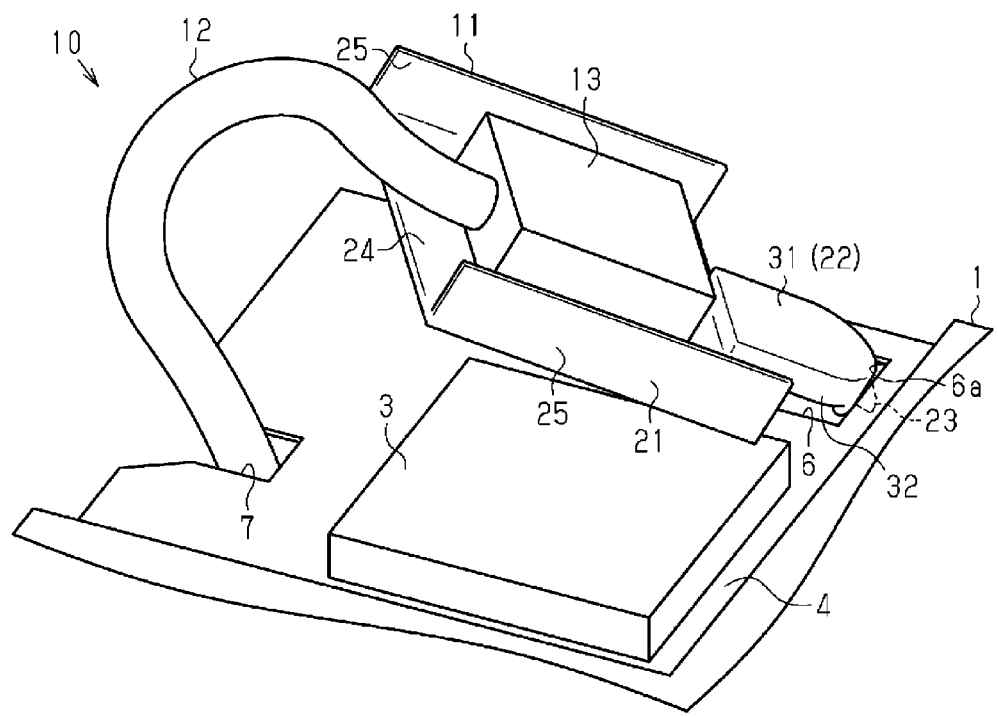
FIG. 2 is a perspective view illustrating the installment panel before being attached to the vehicle according to the same embodiment.

As illustrated in FIG. 2, in a state before the installment panel 1 is attached to the vehicle body 2, the connector holder 11 of the wire harness 10 is temporarily held against the installment panel 1.

Figure 3:
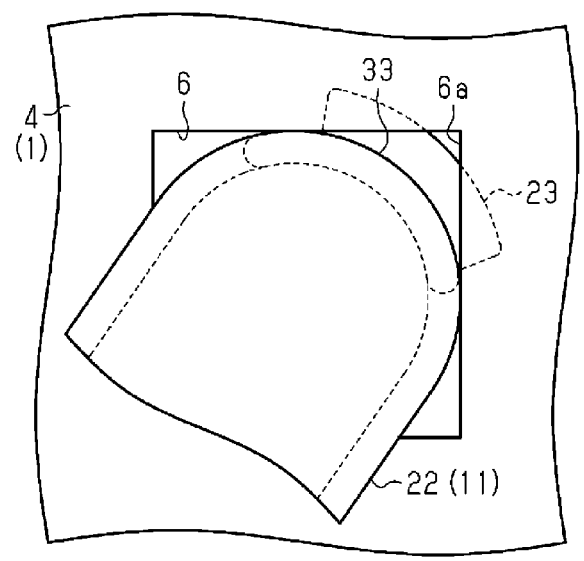
FIG. 3 is a plan view illustrating the connector holder in a temporarily held state.

Specifically, as illustrated in FIGS. 2 and 3, the locking portion 23 of the connector holder 11 is locked into the cover attachment hole 6 of the installment panel 1, temporarily holding the connector holder 11 is a manner such that it does not fall from the installment panel 1. In this state, the locking portion 23 is slid through to the inner portion side of the cover attachment hole 6 at the corner portion 6a of the cover attachment hole 6, putting the locking portion 23 in a state where the upper surface catches on the peripheral edge of the cover attachment hole 6. Also, in this state, the curved surface portion 33 of the side portion 32 of the bolt cover portion 22 comes into contact with the two sides of the peripheral edge of the cover attachment hole 6 that form the corner portion 6a. Also, at this time, the connector holding portion 21 of the connector holder 11, while not in contact with the electric device 3, is maintained at an orientation inclined with respect to the device mounting portion 4, and a gap is formed between the connector holding portion 21 and the electric device 3.

Also, when the connector holder 11 is temporarily held in the cover attachment hole 6 by the locking portion 23, the electrical wire 12 connected to the connector 13 extending out from the lead out portion 7 is put in a bend state. Accordingly, the bending counter force of the electrical wire 12 (the force trying to return it to its original state) makes the locking portion 23 catch on the cover attachment hole 6. In other words, the bending counter force of the electrical wire 12 makes the locking portion 23 unable to be easily detached from the cover attachment hole 6. As described above, in a state where the connector holder 11 is temporarily held against the installment panel 1, the installment panel 1 is attached to the vehicle body 2.

Next, the effects of the present embodiment will be described.

1. The connector holder 11 is provided with the locking portion 23 with a projecting shape that allows it to lock into the cover attachment hole 6 formed in the installment panel 1. According to this configuration, by the locking portion 23 of the connector holder 11 being locked in the cover attachment hole 6 of the installment panel 1, the wire harness 10 can be temporarily held in the installment panel 1 in the state before the installment panel 1 is attached to the vehicle body 2. By temporarily holding the wire harness 10, the wire harness 10 is prevented from freely hanging down from the installment panel 1. This allows interference between the wire harness 10 and the vehicle body 2 to be minimized or prevented when the installment panel 1 is attached to the vehicle body 2. Also, with this configuration, because the existing cover attachment hole 6 is used to temporarily hold the connector holder 11, there is no need to provide a separate holding member or the like for temporarily holding the connector holder 11, which means an increase in the number of components is not needed in the configuration and the shape of the installment panel 1 does not need to be changed. For example, in a case where, apart from the cover attachment hole 6, a hole for temporarily holding the connector holder 11 is formed, the water resistance level may be degraded by the increase in holes formed in the installment panel 1. However, with this configuration, the water resistance level of the installment panel 1 is not degraded.

2. The wire harness 10 is provided with the connector holding portion 21 for holding the connector 13 of the wire harness 10 and the bolt cover portion 22 extending from the connector holding portion 21. The bolt cover portion 22 is configured to cover the bolt B fixed to the vehicle body 2 in a state where the connector holding portion 21 is fixed to the vehicle body 2. Also, the locking portion 23 is provided on the bolt cover portion 22. According to this configuration, a suitable configuration can be achieved because the locking portion 23 can be easily locked on the cover attachment hole 6 due to the locking portion 23 being provided on the bolt cover portion 22 extending from the connector holding portion 21.

3. The bolt cover portion 22 is provided with the main surface portion 31 that faces the bolt B in the projection direction of the bolt B from the surface of the vehicle body 2 and the side portion 32 projecting from the edge portion of the main surface portion 31 toward the vehicle body 2. Also, the locking portion 23 projects from the side portion 32 of the bolt cover portion 22 to the side opposite the main surface portion 31. According to this configuration, the connector holder 11 is suitably held in the cover attachment hole 6 by the side portion 32 of the bolt cover portion 22 and the locking portion 23 projecting from the side portion 32.

4. The cover 5 is configured to cover the electric device 3 attached to the installment panel 1. According to this configuration, the connector holder 11 can be temporarily held in the cover attachment hole 6 for the cover 5 which covers the electric device 3 installed in the installment panel 1.

The following modifications can be made to the present embodiment. The present embodiment and the following modified examples can be implemented in any combination within the bounds of technical consistency.

Figure 5:
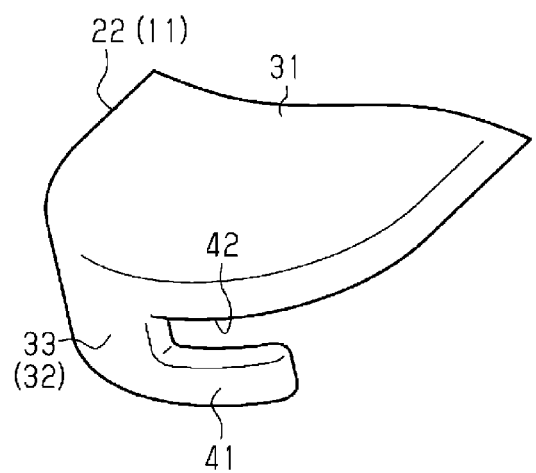
FIG. 5 is a perspective view illustrating a main portion of the connector holder according to a modified example magnified.

As illustrated in FIG. 5, a cut can be made in the side portion 32 of the bolt cover portion 22 in a direction parallel with the main surface portion 31 to configure a portion of the side portion 32 as a locking portion 41. In the configuration illustrated in FIG. 5, the locking portion 41 extending parallel with the main surface portion 31 is formed by forming a cutout portion 42 extending parallel with the main surface portion 31 in the curved surface portion 33 of the side portion 32. In other words, the locking portion 41 and the cutout portion 42 are aligned in the direction orthogonal to the main surface portion 31. In this configuration, the connector holder 11 can be temporarily held by the peripheral edge of the cover attachment hole 6 being inserted into the cutout portion 42 and the locking portion 41 catching on the back side of the cover attachment hole 6.

In the embodiment described above, the locking portion 23 is provided on the bolt cover portion 22. However, the locking portion 23 may project from another portion of the connector holder 11, such as the side walls 25 of the connector holding portion 21. Note that the locking portion 23 is preferably provided at a portion extending out from the connector holding portion 21 in a direction parallel with the main portion 24. Also, in the case of a configuration in which the locking portion 23 is not provided on the bolt cover portion 22, the connector holder 11 can be configured without the bolt cover portion 22.

In the embodiment described above, a speaker is used as an example of the electric device 3 covered by the cover 5. However, no such limitation is intended, and the cover may cover an electric device other than a speaker. Also, the cover 5 is not limited to a cover for covering an electric device, and, as long as it is attached to the body portion of the installment panel 1, the cover 5 may be a cover for covering a component other than an electric device.

The vehicle body 2 of the embodiment may be referred to as a regular attachment position or a first attachment position where the connector holder 11 of the wire harness 10 is attached in a non-temporary manner. The connector holder 11 attached to the vehicle body 2 may be electrically connected to a mating connector attached to the vehicle body 2 at the regular attachment position. The installment panel 1 of the embodiment may be referred to as a non-body vehicle component that is not the vehicle body 2. The cover attachment hole 6 of the embodiment may be referred to as a temporary attachment position or a second attachment position where the connector holder 11 of the wire harness 10 is temporarily attached. The connector holder 11 temporarily attached to the cover attachment hole 6 of the installment panel 1 may be unable to be electrically connected to a mating connector attached to the vehicle body 2 at the temporary attachment position. The lead out portion 7 of the embodiment may be referred to as an electrical wire passage opening configured to allow passage for the electrical wire 12.

The combination of the installment panel 1 and the wire harness 10 of the embodiment may be referred to as an installment panel assembly. The combination of the vehicle body 2, the installment panel 1, and the wire harness 10 of the embodiment may be referred to as a wire harness attachment structure.

The present disclosure includes the following aspects. Components of the exemplary embodiments are denoted with reference signs to facilitate understanding and no limitation is intended. One or more portions of the items described in the following aspects may be omitted, and two or more of the items described in the aspects may be selected or extracted and combined.

[Supplement 1] Some aspects of the present disclosure are directed at the connector holder (11) configured to hold the connector (13) provided on the leading end of the electrical wire (12) of the wire harness (10), wherein the connector holder (11) may be configured so that the connector (13) is attached in a non-temporary manner at the first attachment position to connect the connector (13) to a mating connector at the first attachment position of the vehicle body (2); and the connector holder (11) may include a projection (23) configured to detachably engage with the non-body vehicle component (1) that is not the vehicle body (2) at the second attachment position (6) so that the connector holder (11) be can temporarily attached at the second attachment position (6) of the non-body vehicle component (1).

[Supplement 2] In an aspect of the present disclosure, the non-body vehicle component (1) may be a vehicle installment panel, and the projection (23) of the connector holder (11) may be configured to engage with the vehicle installment panel (1) at the second attachment position (6) so that the connector (13) is restricted from freely moving relative to the vehicle installment panel (1).

[Supplement 3] In an aspect of the present disclosure, the vehicle installment panel (1) may include the hole (6) for fixing the vehicle component (5) that is not the wire harness (10) to the vehicle installment panel (1), and the projection (23) of the connector holder (11) may be configured to form a male/female engagement with the hole (6) at the second attachment position (6).

[Supplement 4] Some aspects of the present disclosure are directed at a vehicle installment panel assembly. The vehicle installment panel assembly may be provided with the wire harness (10) including the electrical wire (12), the connector (13) provided on the leading end of the electrical wire (12), and the connector holder (11) configured to hold the connector (13) and the vehicle installment panel (1) including the device mounting portion (4) where the electric device (3) of the vehicle is mounted, wherein the connector holder (11) may be configured to attach the connector (13) at the first attachment position in a non-temporary manner so that the connector (13) is connected to a mating connector at the first attachment position of the vehicle body (2) that is not the vehicle installment panel (1); and the connector holder (11) may include the projection (23) configured to detachably engage with the vehicle installment panel (1) at the second attachment position (6) to temporarily attach the connector holder (11) at the second attachment position (6) of the vehicle installment panel (1).

[Supplement 5] In an aspect of the present disclosure, the vehicle installment panel (1) may include the hole (6) for fixing the vehicle component (5) that is not the wire harness (10) to the vehicle installment panel (1).

[Supplement 6] In an aspect of the present disclosure, the vehicle installment panel (1) may include the electrical wire passage opening (7) configured to allow passage for the electrical wire (12).

LIST OF REFERENCE NUMERALS

1 Installment panel
2 Vehicle body
3 Electric device
4 Device mounting portion
5 Cover
6 Cover attachment hole
6a Corner portion
7 Lead out portion
10 Wire harness
11 Connector holder
12 Electrical wire
13 Connector
21 Connector holding portion
22 Bolt cover portion
23 Locking portion
24 Main portion
25 Side wall
31 Main surface portion 32 Side portion
33 Curved surface portion
41 Locking portion
42 Cutout portion
B Bolt

What is claimed is:

1. A connector holder comprising:
a connector holding portion for holding a connector of a wire harness on which the connector holder is mounted, the wire harness being attached to an installment panel of a vehicle;
a bolt cover portion that extends from the connector holding portion; and
a locking portion provided on the bolt cover portion and having a projecting shape that allows the locking portion to be locked in a cover attachment hole formed in the installment panel, the cover attachment hole being for attaching a cover to the installment panel,
wherein the bolt cover portion is configured to cover a bolt fixed to a vehicle body in a state where the connector holding portion is fixed to the vehicle body.

2. The connector holder according to claim 1, wherein
the bolt cover portion includes a main surface portion facing the bolt in a projection direction of the bolt from a surface of the vehicle body and a side portion projecting toward the vehicle body from an edge portion of the main surface portion; and
the locking portion projects from the side portion to a side opposite the main surface portion.

3. The connector holder according to claim 1, wherein
the cover is configured to cover an electric device attached to the installment panel.

4. A wire harness, comprising:
an electrical wire extending from an installment panel;
a connector provided on an end portion of the electrical wire; and
the connector holder according to claim 1 connected to the connector.

* * * * *